United States Patent
Hrachova et al.

(10) Patent No.: US 12,409,613 B2
(45) Date of Patent: Sep. 9, 2025

(54) PROCESS FOR THE PREPARATION OF A BONDED STRUCTURE, A BONDED STRUCTURE AND USE OF SAID BONDED STRUCTURE FOR PREPARING AN AUTOMOTIVE PART

(71) Applicant: SABIC GLOBAL TECHNOLOGIES B.V., Bergen op Zoom (NL)

(72) Inventors: Jana Hrachova, Sittard (NL); Sander Knauf, Landgraaf (NL); Barbara Dordi, Bergen op Zoom (NL); Hans Leenders, Bergen op Zoom (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 116 days.

(21) Appl. No.: 17/783,302

(22) PCT Filed: Dec. 18, 2020

(86) PCT No.: PCT/EP2020/087024
§ 371 (c)(1),
(2) Date: Jun. 8, 2022

(87) PCT Pub. No.: WO2021/123167
PCT Pub. Date: Jun. 24, 2021

(65) Prior Publication Data
US 2023/0024134 A1 Jan. 26, 2023

(30) Foreign Application Priority Data
Dec. 20, 2019 (EP) .................................. 19218666

(51) Int. Cl.
B29C 65/00 (2006.01)
B29K 23/00 (2006.01)
B29K 309/08 (2006.01)
B29L 31/30 (2006.01)

(52) U.S. Cl.
CPC ........... B29C 66/028 (2013.01); B29C 66/71 (2013.01); B29C 66/7212 (2013.01); B29C 66/919 (2013.01); B29K 2023/06 (2013.01); B29K 2023/12 (2013.01); B29K 2309/08 (2013.01); B29L 2031/3008 (2013.01); B29L 2031/3044 (2013.01); B29L 2031/3058 (2013.01)

(58) Field of Classification Search
CPC ... B29C 66/028; B29C 66/71; B29C 66/7212; B29C 66/919; B29C 59/08; B29K 2023/06; B29K 2023/12; B29K 2309/08; B29L 2031/3008; B29L 2031/3044; B29L 2031/3058; B32B 38/0008; B32B 38/0036; B32B 2310/0445; B32B 2310/0463; B32B 2310/0472; C09J 5/02
USPC ........................................... 156/82; 427/223
See application file for complete search history.

(56) References Cited

U.S. PATENT DOCUMENTS

| | | | | |
|---|---|---|---|---|
| 4,075,388 | A | 2/1978 | Doss | |
| 4,963,636 | A * | 10/1990 | Mulhaupt | C09J 175/04 528/44 |
| 6,552,095 | B1 * | 4/2003 | Tochioka | B29C 66/1122 521/54 |
| 2006/0121284 | A1 | 6/2006 | Held et al. | |
| 2015/0380586 | A1 | 12/2015 | Hatakeyama | |
| 2018/0333944 | A1 * | 11/2018 | Valdmaa | B32B 37/1207 |

FOREIGN PATENT DOCUMENTS

| | | | | |
|---|---|---|---|---|
| AT | 14028 U1 * | 12/2014 | | E04F 15/10 |
| AU | 6665381 A | 8/1982 | | |
| EP | 1873192 A2 | 1/2008 | | |
| EP | 3406425 A1 | 11/2018 | | |
| EP | 3406659 A1 | 11/2018 | | |
| GB | 1092840 A | 11/1967 | | |
| GB | 2052379 A | 1/1981 | | |
| JP | 2003027012 A * | 1/2003 | | B29C 65/00 |
| JP | 2005053947 A * | 3/2005 | | |
| WO | WO-2013064506 A1 * | 5/2013 | | B05D 3/0218 |
| WO | 2016001055 A1 | 1/2016 | | |

OTHER PUBLICATIONS

Machine translation of JP 2003027012 date unknown.*
International Search Report for the corresponding International Application No. PCT/EP2020/087024; International Filing Date: Dec. 18, 2020; Date of Mailing: Apr. 9, 2021; 75 pages.

* cited by examiner

*Primary Examiner* — John L Goff, II
(74) *Attorney, Agent, or Firm* — CANTOR COLBURN LLP

(57) ABSTRACT

The invention relates a process for the preparation of a bonded structure (4) comprising at least a first plastic part (1) having a first bonding surface (1a), said process comprising the step of a) treating at least part of a first bonding surface of said first plastic part with a flame of a propane-comprising gas, said propane-comprising gas being propane or a mixture comprising at least 50 wt. % of propane based on the weight of the propane-comprising gas with one or more gases selected from the group consisting of methane, ethane, butane, pentane, and hexane, wherein, during treatment with a flame of the propane-comprising gas, a flame is produced by burning a mixture of air and the propane-comprising gas, wherein the gas-to-air ratio is chosen such that the propane gas to oxygen volume ratio is equal to or less than 1:5.01, for example less than 1:5.00 and preferably at least 3.50 to obtain a first plastic part having a flame-treated first bonding surface.

11 Claims, No Drawings

PROCESS FOR THE PREPARATION OF A BONDED STRUCTURE, A BONDED STRUCTURE AND USE OF SAID BONDED STRUCTURE FOR PREPARING AN AUTOMOTIVE PART

CROSS-REFERENCE TO RELATED APPLICATIONS

This application is a National Stage application of PCT/EP2020/087024, filed Dec. 18, 2020, which claims benefit of European Application No. 19218666.6 filed on Dec. 20, 2019, both of which are incorporated by reference herein in their entirety.

BACKGROUND

Polymeric materials can be bonded by means of a bonding agent that is applied to the bonding surfaces of the materials to be bonded. This requires deposition of the bonding agent onto the bonding surfaces of the polymeric materials. Adhesion of the bonding agent to the bonding surfaces might be difficult to accomplish due to the inherent incompatible chemical nature of the two materials (bonding agent versus polymeric material). This difficulty can be overcome by applying an adhesion promoter to the bonding surface before applying the bonding agent, or by enhancing the adhesion strength of the polymeric material, i.e. by surface activation of the bonding surface of the polymeric material(s).

Patent application EP 1 873 192 A2 describes activation of a polypropylene surface by treating said surface with atmospheric plasma, low pressure plasma, by flame, with a corona-treatment or by fluorination. Patent application AU-B-66653/81 describes a method for bonding two polyolefin surfaces together, in which the surfaces are first subjected to a fast heating treatment with a flame, during 15 to 30 seconds until the opacity of the surfaces changes. Patent application AU 66653 81 A discloses a method for the pretreatment of a plastics surface prior to bonding of the plastic surface to another surface by use of an adhesive, which comprises exposing the plastics surface to a hot blue gas flame. Patent application U.S. Pat. No. 4,075,388 A discloses preatreating a first solid surface consisting of a material selected from the group consisting of unfilled poly(arylene sulphide) and fiberglass-filled poly(arylene sulphide) by mechanically roughening this first surface or, in the alternative, pretreating with flame a first solid surface of unfilled poly(arylene sulphide).

However, none of these documents describes an improved method that provides suitable surface activation.

Therefore, there is a need of an improved method for the preparation of an activated bonding surface to prepare a bonded structure.

OBJECTS OF THE INVENTION

It is an object of the present invention to provide a process for improved bonding.

It is another object of the present invention to provide a bonded structure that is suitable for preparing an automotive part.

SUMMARY OF THE INVENTION

The present invention relates to a process for the preparation of a bonded structure comprising at least a first plastic part having a first bonding surface, said process comprising the step of:

a) treating at least part of a first bonding surface of said first plastic part with a flame of a propane-comprising gas, said propane-comprising gas being propane or a mixture comprising at least 50 wt. % of propane based on the weight of the propane-comprising gas with one or more gases selected from the group consisting of methane, ethane, butane, pentane, and hexane, wherein, during treatment with a flame of the propane-comprising gas, a flame is produced by burning a mixture of air and the propane-comprising gas, wherein the gas-to-air ratio is chosen such that the propane gas to oxygen volume ratio is equal to or less than 1:5.01, for example less than 1:5.00 and preferably at least 3.50 to obtain a first plastic part having a flame-treated first bonding surface;

In one embodiment, the process of the invention further comprises the sequential steps of:

b2) providing a composition comprising a polymer and optionally a foaming agent or a composition comprising polyurethane precursors, on at least part of the flame treated first bonding surface and c2) allowing the composition to form a foam.

To prepare a polyurethane foam, isocyanate(s) and polyol(s) are reacted in a manner known per se; isocyanate(s) and polyol(s) together are referred to herein as polyurethane precursors.

For a polymer composition comprising polymer, a foaming agent is needed to prepare the foam. The polymer composition may be heated, which causes the polymer composition to melt and to yield gas.

Providing a foam on at least part of the first bonding surface can for example be done by putting the first plastic part into a mould, wherein the first plastic part does not completely fill the mould and injecting the composition comprising polyurethane precursors or comprising a polymer and a foaming agent into the mould and onto at least part of the first bonding surface.

In case of polyurethane precursors, the foam will form by the reaction of the polyurethane precursors. In case of the polymer and the foaming agent, the composition needs to be heated, after which the foam is formed.

When the foaming is complete, the foam article is allowed to solidify by cooling.

Examples of foaming agents are known to the person skilled in the art and include physical foaming agents such as carbon dioxide, nitrogen, butane, pentane and water and chemical foaming agents, for example citric acid and sodium bicarbonate mixtures such as those commercially available from Clariant, PolyOne and Adeka.

This embodiment is in particular suitable for preparing instrument panel carriers.

For example, the first plastic part may be prepared from a composition comprising polypropylene and long glass fibers, for example from compositions as commercially available from SABIC under the trademark STAMAX™ polypropylene.

In another embodiment, the process further comprises the sequential steps of:

b3) applying one or more layers of a primer or at least one basecoat on at least part of the flame treated first bonding surface and c3) in case one or more layers of a primer are applied, applying at least one basecoat on said layer(s) and d3) applying at least one clearcoat on the at least one basecoat.

A basecoat as defined herein is a coating that contains at least one pigment. A clearcoat as defined herein is a transparent coating.

For example, the first plastic part may be prepared from a composition comprising polypropylene and a mineral filler.

The process of this embodiment, is in particularly suitable for preparing coated bumpers. The bumper prepared in this way may consist of the first bonding surface, which first bonding surface is in direct contact with a primer, which primer is in direct contact with one or more basecoats and a clearcoat which clearcoat is in direct contact with the basecoat(s).

In another embodiment, the process further comprises the sequential steps of:
b1) providing a second plastic part, wherein the second plastic part has a second bonding surface and
c1) contacting said first and second bonding surfaces with a bonding agent (3) together by contacting at least part of the flame-treated first bonding surface and at least part of said second bonding surface with said bonding agent.

The process of this embodiment, is in particular suitable for preparing a tailgate or a roof spoiler.

Before step c1), at least part of the second bonding surface may be treated with a flame of a propane-comprising gas, said propane-comprising gas being propane or a mixture comprising at least 50 wt. % of propane with one or more gases selected from the group consisting of ethane, butane, and hexane wherein, preferably during treatment with a flame of the propane-comprising gas, a flame is produced by burning a mixture of air and the propane-comprising gas, wherein the gas-to-air ratio is chosen such that the propane gas to oxygen volume ratio is equal to or less than 1:5.01, for example less than 1:5.00 and preferably at least 3.50 to obtain a second plastic part having a flame-treated second bonding surface.

The propane-comprising gas can comprise at least 80 wt. % propane, preferably at least 95 wt. % propane, more preferably at least 99 wt. % propane, or even 100 wt. % based on the weight of the propane-comprising gas.

A burner may be used for producing the flame, said burner comprising at least one nozzle for providing a mixture of air and the propane-comprising gas to be burned, wherein the gap between the at least one nozzle and said first bonding surface and/or said second bonding surface is between 5 cm and 15 cm, preferably 8 cm.

The temperature reached on the said flame-treated first bonding surface and/or flame-treated second boding surface during treatment with a flame of a propane-comprising gas, may for example be between 30° C. and 90° C., preferably between 50° C. and 80° C., more preferably between 60° C. and 65° C.

The surface energy of the flame-treated first bonding surface and/or flame-treated second bonding surface is preferably higher than 30 mN/m, and the polar part of the surface energy is preferably higher than 1.5 mN/m, preferably higher than 2 mN/m.

The process may further comprise applying a primer on said flame-treated first bonding surface and/or flame-treated second bonding surface before performing step c1).

In case a bonding agent is used, the bonding agent may be a single-component adhesive, preferably based on polyurethane and/or preferably comprising at most 1 wt % $H_2O$, even more preferably at most 0.5 wt. % $H_2O$.

The bonding agent may also be a two-component adhesive, comprising a first resin component, preferably a polyol resin; and comprising a second hardener component, preferably an isocyanate hardener.

The first plastic part and second plastic part may each independently comprise a polymer selected from the group consisting of: polyolefin (PO), polycarbonate (PC), acrylonitrile-butadiene-styrene (ABS), acrylonitrile-styrene-acrylate (ASA), polyethylene terephthalate (PET) and combinations thereof.

With "the first plastic part can comprise a polymer" is meant that the first plastic part comprises at least 35 wt %, for example at least 50 wt %, for example at least 75 wt. %, or at least 83 wt % or even 99 wt % or 100% of one or more polymers based on the weight of the first plastic part.

With "the second plastic part can comprise a polymer" is meant that the second plastic part comprises at least 35 wt %, for example at least 50 wt %, for example at least 75 wt. %, or at least 83 wt % or even 99 wt % or 100 wt % of one or more polymers based on the weight of the second plastic part.

The first plastic part and the second plastic part may comprise the same polymer(s).

Preferably, the polyolefin is polypropylene or a combination of polypropylene and polyethylene, wherein preferably the polyolefin comprises at least 45 wt. % polypropylene based on the total weight of the polyolefin.

In another aspect, the invention relates to a bonded structure obtainable or obtained by the process according to the invention.

In another aspect, the invention relates to a use of the bonded structure as an automotive part, for example as a tailgate or roof spoiler, an instrument panel carrier or a bumper.

All embodiments specified for the processes according to the invention are also applicable for the products and their uses, unless otherwise specified.

Definitions

The following definitions are used in the present description.

"Bonding agent", as used in the present application, means a material capable of fasten two surfaces together, usually producing a smooth bond. A bonding agent is also known as an adhesive.

"Gap between the burner nozzle(s) and the surface", as used in the present application, means the distance between the burner nozzles and the surface to be treated, for example, the surface of a plastic part.

"Gas-to-air ratio", as used in the present application, means, the ratio of parts of gas to parts of air used in a flame, i.e. in the total gas and air flow. Unless otherwise specified, the ratio is a volume ratio. For example, 1:17, means that for 1 L of gas fed to the flame 17 L of air is used as oxidiser.

"Treatment speed", as used in the present application, means, the length of a surface that is exposed to the flame per unit time; for example, the length of the surface of a plastic part per unit time that is exposed to the flame. In this sense, a treatment speed of 300 mm/s means that 300 mm of the surface of, e.g. a plastic part, is exposed to the flame per second.

"Total flow of gas and air mixture", as used in the present application, means the litres per unit time of the mixture gas and air that is fed to the burner in order to produce the flame. For example, a total flow of gas and air mixture of 300 L/min, means that 300 litres of gas and air mixture are fed to the burner in order to produce the flame.

"Cohesive failure (CF)", as used in the present application, means fracture of the bonded material within the bonding agent. This means that there is an internal breakdown of the bonding agent, and the breakdown takes place approximately along the centre plane of the bonding agent located parallel to both bonding surfaces. This is also known as normal cohesive failure.

"Special cohesive failure (SCF)", as used in the present application, means fracture of the bonded material within the bonded parts. This means that there is an internal breakdown of the bonded parts, with the particularity that the breakdown does not take place approximately along the centre of the plane of the bonding agent located parallel to both bonding surfaces; e.g. it can occur perpendicular to, or not approximately along, the centre plane of the bonding agent located parallel to both bonding surfaces.

"Cohesive substrate failure (CSF)", as used in the present application, means fracture of the bonded material. This means that there is an internal breakdown on one of the bonded parts in the zone adjacent to the adhesive and approximately along the centre of the plane of the bonding agent located parallel to both bonding surfaces, without internal breakdown of the bonding agent.

"Substrate failure (SF)", as used in the present application, means fracture of the bonded material on one of the bonded parts in the zone adjacent to the bonding agent and approximately along the centre of the plane of the bonding agent locates perpendicular to the bonding surfaces, without internal breakdown of the bonding agent.

"Adhesive failure (AF)", as used in the present application, means that the bonds between the adhesive and the bonded surfaces break. This means that the adhesive is retained on only one surface of the surfaces that were bonded.

"CF/AF", as used in the present application, means that the bonds between the bonding agent and the bonded surfaces break exhibiting a combination of cohesive failure and adhesive failure. This means there are areas of the bonded surfaces after de-bonding showing no residuals of the adhesive, and areas on the same bonded surface showing residuals of the adhesive. In this case, more than 50% of the bonded area after de-bonding shows a cohesive failure.

"AF/CF", as used in the present application, means that the bonds between the bonding agent and the bonded surfaces break exhibiting a combination of adhesive failure and cohesive failure. This means there are areas of the bonding surfaces after de-bonding showing no residuals of the adhesive, and areas on the same bonding surface showing residuals of the adhesive. In this case, more than 50% of the bonded area after de-bonding shows adhesive failure.

"SCF/CF", as used in the present application, means that the bonds between the bonding agent and the bonded surfaces break exhibiting a combination of special cohesive failure and normal cohesive failure. More than 50% of the bonded area after de-bonding shows special cohesive failure.

"Activation of the surface or surface activation", as used in the present application, means, modification of the surface chemistry of a solid, e.g. a plastic part, leading to an increase of its surface energy (also known as surface free energy), an increase of the polar part contributing to the surface energy, and/or a decrease of the contact angle of the surface with water.

"Surface energy", as used in the present application, means the surface free energy calculated according to the Owens, Wendt, Rabel and Kaelble method, which is a standard method for calculating the surface free energy of a solid from the contact angle with two liquids water, diiodomethane. This allows for the determination of the surface energy, which is divided into a polar part and a disperse (or dispersive) part. Based on the theory by Owens, Wendt, Rabel and Kaelble, the surface tension (a) can be divided into a polar and disperse part as follows:

$$\sigma_l = \sigma_l^P + \sigma_l^D \text{ and } \sigma_s = \sigma_s^P + \sigma_s^D \quad (1)$$

with P for polar, D for disperse and s for solid and l for liquid.

$$\sigma_s = \gamma_{sl} + \sigma_l \cdot \cos\theta$$

It is well know that, according to Young, the correlation of the surface tension between the solid and the liquid, $\sigma_{s,l}$, the surface energy between the solid and the liquid $\gamma_{sl}$ and the contact angle $\theta$ can be described as follows:

$$\sigma_s = \gamma_{sl} + \sigma_l \cdot \cos\theta \quad (2)$$

Owens and Wendt hypothesised the following equation for the surface energy:

$$\gamma_{sl} = \sigma_s + \sigma_l - 2 \cdot (\sqrt{\sigma_s^D \cdot \sigma_l^D} + \sqrt{\sigma_s^P \cdot \sigma_l^P}) \quad (3)$$

The combination of equations (2) and (3) leads to the following linear equation:

$$\frac{(1+\cos\theta)\cdot\sigma_l}{2\sqrt{\sigma_l^D}} = \sqrt{\sigma_s^D} + \sqrt{\sigma_s^P}\sqrt{\frac{\sigma_l^P}{\sigma_l^D}}$$

which can be written as $$m = b + m \cdot x \quad (4)$$

By using a linear regression in an x-y coordinate system, $\sigma_s^P$ can be estimated by the square of the slope m and $\sigma_s^D$ can be estimated by the square of the ordinate intercept b.

To estimate the polar and disperse part, water and diiodomethane are used due to their diverse $\sqrt{\sigma_l^P}/\sqrt{\sigma_l^D}$-ratio.

DETAILED DESCRIPTION

The present application relates in a first aspect to a process for the preparation of a bonded structure comprising at least a first plastic part having a first bonding surface, a bonding agent and a second plastic part having a second bonding surface, wherein said first and second bonding surfaces are in contact with said bonding agent, said process preferably comprising the steps of:
a) treating at least part of a first bonding surface of said first plastic part with a flame of a propane-comprising gas, said propane-comprising gas being propane or a mixture comprising at least 50 wt. % of propane based on the weight of the propane-comprising gas with one or more gases selected from the group consisting of methane, ethane, butane, pentane, and hexane to obtain a first plastic part having a flame-treated first bonding surface;
b) providing a second plastic part having a second bonding surface;
c) bonding said first plastic part and said second plastic part together by contacting at least part of the flame-treated first bonding surface and at least part of said second bonding surface with said bonding agent.

With the process according to the invention a bonded structure is obtained in which the adhesion failure is reduced or even suppressed. This is an indication that the bonding surface of at least a first plastic part is activated, and that good adhesion between the bonding agent and the bonding surfaces is obtained.

Before step c1), at least part of the second bonding surface may be treated with a flame of a propane-comprising gas, said propane-comprising gas being propane or a mixture comprising at least 50 wt. % of propane with one or more gases selected from the group consisting of ethane, butane, and hexane to obtain a second plastic part having a flame-treated second bonding surface.

The first bonding surface can be washed before performing step a) of the method according to the invention. The second bonding surface can also be washed before bonding this to the first plastic part or before subjecting this to a treatment with a flame of propane-comprising gas. The second bonding surface may also be activated using a different activation method, by treating said surface with e.g. atmospheric plasma, low pressure plasma, with a corona-treatment or by fluorination.

The washing step can be performed by immersing the plastic part in a solution comprising a cleansing agent, such as a surfactant. The washing step can also comprise immersing the plastic part in a solvent, such as an alcohol, preferably an alcohol chosen from the group of propanol, isopropyl alcohol, more preferably isopropyl alcohol with a purity higher than 96 wt. %.

The washing step can be substituted by a cleaning step, which comprises applying a solution comprising a cleansing agent or a solvent to the bonding surface, optionally followed by rinsing said surface with water.

With at least part of a first bonding surface is treated, or at least part of a second bonding surface is treated, is meant that preferably at least 80%, more preferably at least 90%, even more preferably at least 95% or even at least 99% or 100% of the first bonding surface or the second bonding surface is treated, respectively.

It will be understood that the bigger the surface of the bonding surface that is treated, the better the surface is activated and as a consequence the better adhesion failure will be reduced or even supressed.

A primer may be applied on the flame-treated first bonding surface and/or the (flame-treated) second bonding surface before performing step c1). By applying a primer the flame-treated surfaces can be further activated, meaning that adhesion between the bonding agent and the bonding surfaces is further improved.

A primer is also known as an adhesion promoter. This is a preparatory coating that is applied onto a bonding surface before contacting the surface with a bonding agent or basecoat, in order to ensure better adhesion of the bonding agent or basecoat to the bonding surface.

In the present application a first bonding surface can also be understood as a first bonding surface that has been washed or cleaned. Moreover, a first flame-treated bonding surface can also be understood as a first flame-treated bonding surface onto which a primer has been applied, i.e. primer- and flame-treated bonding surface. In other words, when the first bonding surface may be first flame treated and then provided with a primer, i.e. primer- and flame-treated first bonding surface.

In the present application a second bonding surface can also be understood as a second bonding surface that has been washed or cleaned. Moreover, a second bonding surface can also be understood as a second bonding surface that has been flame treated, i.e. flame-treated second bonding surface. Furthermore, a second boding surface can also be understood as a second bonding surface onto which a primer has been applied after having been flame treated, i.e. primer- and flame-treated second bonding surface. In other words, when the second bonding surface may be first flame treated and then provided with a primer, i.e. primer- and flame-treated second bonding surface.

The flame treatment can be performed using a burner for producing the flame. The burner is fed with a defined mixture of a fuel (propane-comprising gas) and an oxidiser (air), thoroughly premixed before combustion. In the flame treatment, during the application of heat by the flame, bonds between atoms and/or molecular chains are broken up on the surface and oxygen contents contained in the flame are bound to the breaking point. In this way polar molecules arise on the surface of the original non-polar material. The mechanical properties of the surfaces do not change.

Variables affecting the flame treatment are for example, the gas-to-air ratio, the composition of the gas, the gap between the burner nozzles and the bonding surface, the treatment speed, and the total flow of gas and air mixture. These variables affect the temperature reached on the flame treated bonding surface during the flame treatment.

The present applicants have observed that by using a propane-containing gas being propane or a mixture comprising at least 50 wt. % of propane the bonding surface of plastic parts is activated. Preferably, the propane-comprising gas comprises at least 80 wt. % propane, more preferably at least 95 wt. % propane, such as for example at least 99 wt. % propane or even 100 wt. % of propane.

During treatment with a flame of a propane-comprising gas, a flame is produced by burning a mixture of air and the propane-comprising gas, wherein the gas-to-air ratio is chosen such that the propane to oxygen ratio is equal to or less than 1:5.01. This also contributes to a further activation of the bonding surface of a plastic part.

The plastic parts, i.e. first plastic part and/or second plastic part, can comprise a polymer selected from the group consisting of: polyolefins, polycarbonate (PC), acrylonitrile-butadiene-styrene (ABS), acrylonitrile-styrene-acrylate (ASA), polyethylene terephthalate (PET) and combinations thereof. The polymer can comprise an additive, such as stabilizers, antioxidants, pigments; wherein the polymer preferably comprises at most 5% of the additive. The combination can be a blend or a copolymer. The polymer can be filled with a mineral filler; e.g. talc, or glass fibers; for example, the polymer can comprise at most 45 wt. % of the filler, such as for example at most 40 wt. % of the filler, based on the total weight of the polymer.

The glass fibers used as filler in the polymer can be long and/or short glass fibers. Short glass fibers in the polymer may have an average length of up to 1.0 mm. Long glass fibers in the polymer may have an average length of 1.0 to 4.5 mm, for example 2.0 to 4.0 mm. The diameter of the glass fibers can be 5.0 to 50.0 micrometers, specifically, 8.0 to 30.0 micrometers, more specifically, 10.0 to 20.0 micrometers. The lengths and the diameters of the glass fibers can be determined based on the photo images by an image analysis software. The term "average" refers to an arithmetic average.

For example, the polyolefin is polypropylene or a combination of polypropylene and polyethylene, wherein preferably the polyolefin comprises at least 45 wt. % polypropylene based on the total weight of the polyolefin.

For example, the plastic parts, i.e. first plastic part and/or second plastic part, comprise a polyolefin filled with at most 40 wt. % of a filler based on the total weight of the polyolefin, wherein the polyolefin comprises a polypropylene or a combination of polypropylene and polyethylene, wherein preferably the polyolefin comprises at least 45 wt. % polypropylene based on the total weight of the polyolefin.

With "a combination of polypropylene and polyethylene" is meant a heterophasic propylene copolymer or polypropylene impact copolymer, which is a polypropylene blended with an elastomer impact modifier, such as polyethylene particles, C2-C8 (ethylene-octene copolymer) elastomer impact modifier or C2-C4 (ethylene-butene copolymer) impact modifier.

Furthermore, the plastic part, i.e. first plastic part and/or second plastic part, can comprise a polymer comprising a blend of polycarbonate with one or more polymers selected from the group consisting of: acrylonitrile-butadiene-styrene (ABS), acrylonitrile-styrene-acrylate (ASA), polyethylene terephthalate (PET); preferably the blend comprises at least 40 wt % polycarbonate based on the total weight of the polymer. The polymer can be filled with a mineral filler; e.g. talc, or glass fibers; for example, the polymer can comprise at most 20 wt. % of the filler, based on the total weight of the polymer.

For example, the bonded structure can comprise a first plastic part and a second plastic part, each independently comprising a polymer selected from the group consisting of: polypropylene, a combination of polypropylene and polyethylene, a blend of polycarbonate and acrylonitrile-butadiene-styrene, a blend of polycarbonate and acrylonitrile-styrene-acrylate, acrylonitrile-styrene-acrylate, a blend of polycarbonate and polyethylene terephthalate, and combinations thereof. The polymer can be filled with a mineral filler; e.g. talc, or glass fibers, wherein the polymer comprises at most 45 wt. % of the filler, such as for example at most 40 wt. % of the filler, based on the total weight of the polymer.

The first plastic part and the second plastic part may comprise, for example consist of the same polymer.

A burner can be used for producing the flame, said burner comprising at least one nozzle for providing a mixture of air and the propane-comprising gas to be burned, wherein the gap between the at least one nozzle and the bonding surface can easily be determined by the person skilled in the art. For example, the gap between the first bonding surface or second bonding surface, is, for example, between 5 cm and 15 cm, for example 8 cm. This gap influences the extent of activation accomplished by the flame treatment. A too large distance between the cone of the flame and bonding surface, causes the surface activation to decrease. A too low distance between the cone of the flame and the bonding surface may damage the surface.

The temperature reached on the flame-treated first bonding surface and/or flame-treated second boding surface, during treatment with a flame of a propane-comprising gas, can be between 30° C. and 90° C., preferably between 50° C. and 80° C., more preferably between 60° C. and 65° C.; for example 60° C. At temperatures below 30° C. and above 90° C., the desired increase in surface energy, increase of the polar part of the surface energy and increase wettability of the bonding surface is not obtained, or the surface is over-treated. Preferably, the surface energy of said flame-treated first bonding surface and/or flame-treated second bonding surface is higher than 30 mN/m, and the polar part of the surface energy is higher than 1.5 mN/m, preferably higher than 2 mN/m.

Activation of a polymer surface can be characterized by quantifying the changes on surface free energy and wettability. Surface free energy (SFE) quantifies the disruption of intermolecular bonds that occur when a surface is created. SFE is the energy required to increase the size of the surface of a phase. It can be considered as having a polar and a disperse (or dispersive) part. Wettability is the ability of a liquid (e.g. water) to maintain contact with a solid surface. Wettability is generally determined by measuring is given by the contact angle of water with a surface.

Activation of a polymer surface can then lead to an increase of its surface free energy, an increase of the polar part contributing to the surface free energy, and/or a decrease of the contact angle of the surface with water.

The treatment speed may for example be between 200 mm/s and 1200 mm/s, preferably between 250 mm/s and 1000 mm/s, more preferably between 250 mm/s and 700 mm/s, such as for example 300 mm/s. Moreover, the total flow of gas and air mixture can be between 200 L/min and 750 L/min, preferably 450 L/min.

For example, the bonding agent may be a single-component adhesive, preferably based on polyurethane. The bonding agent, preferably polyurethane-based bonding agent, may comprise at most 1 wt. % $H_2O$, preferably at most 0.5 wt. % $H_2O$. This single-component adhesive can be a moisture-curing type polyurethane adhesive, which contains an isocyanate-terminated prepolymer and which cures by reaction with moisture in the air.

For example, the bonding agent may be a two-component adhesive. There are several types of two-component adhesive systems known, e.g. systems based on polyurethane or epoxy resins or based on moisture cross-linking polymers. The two-component adhesive preferably comprises a first resin component, preferably a polyol resin; and a second hardener component, preferably an isocyanate hardener. Upon combination of the resin and the hardener a chemical reaction takes place to form a bonding agent or adhesive.

The bonding agent may be applied to the first flame-treated bonding surface and/or to the second bonding surface.

A bonded structure can be obtained by the process according to the invention. Such bonded structure can for example be used for as an automotive part, such as a tailgate or a roof spoiler, an instrument panel carrier or a bumper.

It is noted that the invention relates to all possible combinations of features described herein, preferred in particular are those combinations of features that are present in the claims.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process. When values are mentioned for a lower limit and an upper limit, ranges made by the combinations of the values of the lower limit and the values of the upper limit are also understood to be disclosed.

The invention is now elucidated by way of the following examples, without however being limited thereto.

Experiments

The following examples are intended to explain the invention, not to limit the invention.

As specified above, the present invention is related to a method for the preparation of a bonded structure. The bonded structure is formed by bonding a first plastic part and a second plastic part.

The materials used for preparing as the first and second plastic parts are the following:
1. PP LGF filled: is a 40% glass fiber reinforced grade polypropylene. In this material, the glass fibers are chemically coupled to the polypropylene matrix. This material is commercially available as SABIC® STAMAX™ 40YM240E. This material has a density of 1040 kg/m$^3$ measured according to ISO 1183 and a glass fiber content of 40% measured according to ISO 3451.
2. PP talc filled: is a mineral filled elastomer-modified polypropylene. This material has around 22 wt. % of a talc filler and is commercially available as SABIC® PPCOMPOUND 8510E. This material has a density of 1050 kg/m$^3$ measured according to ISO 1183, a filler content of 22 wt. % and a melt flow rate at 230° C. and 2.16 kg of 22 dg/min measured according to ISO 1133.
3. PC/ABS natural: a thermoplastic blend of polycarbonate and acrylonitrile-butadiene-styrene. It is commercially available as SABIC® CYCOLOY™ RESIN XCY620S (natural colored). This material has a density of 1.14 g/cm$^3$ measured according to ISO 1183 and a melt volume rate at 260° C. and 5.0 kg of 20 cm$^3$/10 min measured according to ISO 1133.
4. PC/ABS filled: a thermoplastic blend of polycarbonate and acrylonitrile-butadiene-styrene filled with 15 wt % of inorganic filler (talc). It is commercially available as SABIC® CYCOLOY™ RESIN CM8622. This material has a density of 1.26 g/cm$^3$ measured according to ISO 1183 and a melt volume rate at 260° C. and 5.0 kg of 15 cm$^3$/10 min measured according to ISO 1133.
5. PC/ASA: a blend of polycarbonate and acrylonitrile-styrene-acrylate. It is commercially available as SABIC® GELOY™ RESIN HRA170. This material has a density of 1.15 g/cm$^3$ measured according to ISO 1183 and a melt volume rate at 260° C. and 5.0 kg of 17 cm$^3$/10 min measured according to ISO 1133.
6. ABS: an acrylonitrile-butadiene-styrene. It is commercially available as SABIC® CYCOLAC™ RESIN MG47. This material has a density of 1.04 g/cm$^3$ measured according to ISO 1183 and a melt volume rate at 220° C. and 10.0 kg of 18 cm$^3$/10 min measured according to ISO 1133.
7. ASA: an acrylonitrile-styrene-acrylate. It is commercially available as SABIC® GELOY™ RESIN CR7500. This material has a density of 1.07 g/cm$^3$ measured according to ISO 1183 and a melt volume rate at 260° C. and 5.0 kg of 10 cm$^3$/10 min measured according to ISO 1133.
8. PC/PET filled: a mineral filled blend of polycarbonate and polyethylene terephthalate. It is commercially available as SABIC® XENOY™ RESIN X5230. This material has a density of 1.33 g/cm$^3$ measured according to ISO 1183 and a melt volume rate at 265° C. and 5.0 kg of 24 cm$^3$/10 min measured according to ISO 1133.
9. PC/ABS black: a thermoplastic blend of polycarbonate and acrylonitrile-butadiene-styrene. It is commercially available as SABIC® CYCOLOY™ RESIN XCY620S (black colored). This material has a density of 1.14 g/cm$^3$ measured according to ISO 1183 and a melt volume rate at 260° C. and 5.0 kg of 20 cm$^3$/10 min measured according to ISO 1133.

The materials used as bonding agents are the following:
a. 1-K polyurethane-based adhesive: a single-component, atmospheric humidity-curing polyurethane bonding compound. It is commercially available as Betaseal 8000 (or 8000-1F) from Dow®.
b. 2-K polyurethane-based adhesive: two-component adhesive, in which a first component, a resin, is a polyol and the second component, a hardener, is an isocyanate derivative. The adhesive is formed by mixing the resin and the hardener. It is commercially available as SIKA 7570 HP.

The materials used as primers are the following:
i. Polyisocyanate, to be used with the 1-K adhesive and commercially available as Betaprime 5404 from Dow®.
ii. Solvent-based polyurethane solution, to be used with the 2-K polyurethane based adhesive and commercially available as SIKA 207.

In all the examples shown below, plastic parts are provided having bonding surfaces, which were firstly washed with Isopropyl alcohol (IPA) with a purity of 96 wt. %.

Flame Treatment

Flame treatment consisted in subjecting the washed plastic parts to a flame using a Slot Burner MB3-300 from Arcotec, in which the gas-to-air ratio was maintained between 1:21 to 1:23.9, and with a flame fed comprising 99% propane. The total flow of gas and air mixture was kept at 450 L/min, the distance between burner nozzles and surface was kept at 8 cm and the treatment speed was kept at 300 mm/s. The whole surface of the bonding surface was flame-treated i.e. 100% of the bonding surface was treated.

The surface energy, disperse part of the surface energy, polar part of the surface energy and contact angle were measured using a Krüss Mobile Drop contact angle measurement device, and using the Owens, Wendt, Rabel and Kaelble method for calculating the surface energy from the contact angle with two liquids: water and diiodomethane.

The results of this experiment are shown in the following Table.

TABLE 1

| Example | Material | Surface Energy [mN/m] | Disperse part [mN/m] | Polar part [mN/m] | Contact angle [°] | Final Temp. [° C.] |
|---|---|---|---|---|---|---|
| 1* | PPLGF | 28.4 | 27.7 | 0.7 | 99.6 | — |
| 1 | Filled * | 33.7 | 31.8 | 1.9 | 90.4 | 54 |
| 2* | PP talc | 28.2 | 27.2 | 1 | 98.2 | — |
| 2 | filled | 33.5 | 30.7 | 2.8 | 87.7 | 57 |
| 3* | PC/ABS | 48.9 | 46.2 | 2.7 | 80.3 | — |
| 3 | black | 53 | 40.7 | 12.3 | 60.1 | 60 |

(*) refers to comparative examples, in which the plastic parts were only washed but not subjected to flame treatment.

From Table 1 it can be seen that by subjecting the plastic parts to a flame treatment, the surface energy increases, whilst the polar part also increases to values higher than 1.5 mN/m and the contact angle is reduced. This gives an indication that the surface of the plastic part is activated.

Adhesion Lap Test

Sample Preparation (Bonded Structures)

Samples consisted of bonded structures with plastic parts made of the same material.

The plastic parts were flame-treated by subjecting the washed plastic parts to a flame using a Slot Burner MB3-300 from Arcotec, in which the gas-to-air ratio was maintained between 1:21 to 1:23.9, being 1:21.5, and with a flame fed comprising 100% propane. In some examples (Table 6) this ratio was varied. The total flow of gas and air mixture was kept at 450 L/min, the distance between burner nozzles and surface was kept at 8 cm and the treatment speed was kept at 300 mm/s. The whole surface of the bonding surface was flame-treated i.e. 100% of the bonding surface was treated.

In some examples a primer was applied to the whole surface of both bonding surfaces of the plastic parts.

Subsequently a bonding agent was applied to the whole surface of one of the either flame-treated bonding surfaces or primer- and flame-treated bonding surfaces. Finally both bonding surfaces were bought into contact, having the bonding agent in the middle.

Adhesion lap tests were performed to examine the bonding behaviour of bonded structures.

The bonded structures were subjected to different conditions before performing the lap shear tests.
1. Initial: Curing during 7 days at 23° C. and 50% relative humidity
2. Cataplasma: the sample was completely covered with cloths. Then the wrapped sample was moistened with demineralized water. The sample was then covered with aluminum foil and placed in a polyethylene bag, and air was removed from the bag. The sample in the polyethylene bag was maintained 7 days at 70° C.±2° C., followed by 16 h at a temperature of −20° C.±2° C. and then brought to room temperature. Thereafter, the sample was removed from the bag and the cloths and was reconditioned for 2 h at 23° C.±2° C.
3. PV 1200: environmental resistance according to the standard, VW PV 1200-Testing of Resistance to Environmental Cycle Test (+80/−40) ° C.

Subsequently, a single lap shear tests according to DIN EN 1465:2009 (Determination of tensile lap-shear strength of bonded assemblies) were performed on each sample subjected to different conditions.

Lap shear specimens with dimensions 100×25×4 mm were used for lap shear test. The adhesive was applied in a 1.5 mm thick layer.

Failure analysis was carried out according to DIN EN ISO 10365. The overlap between 2 lap shear specimens has been defined as 12.5 mm (±0.25 mm). The bonding area was measured after testing and was used to calculate the lap-shear strength. The arithmetic average of three to five measurements was taken as a result.

The tensile-shear test was performed using a device built by ZWICK, which can be equipped with different load cells up to 20 kN. The type of failure was determined according to DIN EN ISO 10365.

Effect of Flame Treatment

Tests were performed on samples of a bonded structure having plastic parts made of PC/ABS black, using 1-K or 2-K boding agents (B. Agent). Samples were subjected to different conditions: initial and PV 1200.

Results are shown on Table 2. In this table, Experiments (Ex.) with an (*) refer to comparative examples of samples which were not subjected to flame treatment.

TABLE 2

| Ex | B. Agent | Adhesion Lap Shear Strength [MPa] | | Type of failure | |
|---|---|---|---|---|---|
| | | Initial | PV 1200 | Initial | PV 1200 |
| 4* | 1-K | 1.25 | 4.80 | AF 100% | CF/AF 100% |
| 4 | 1-K | 7.00 | 3.00 | CF, AF/CF 20% | AF 100% |

TABLE 2-continued

| Ex | B. Agent | Adhesion Lap Shear Strength [MPa] | | Type of failure | |
|---|---|---|---|---|---|
| | | Initial | PV 1200 | Initial | PV 1200 |
| 5* | 2-K | 4.00 | 4.50 | AF 100% | CF/AF, CF 33%, SCF/CF 11% |
| 5 | 2-K | 3.25 | 3.90 | CF 100% | CF, SCF 20% |

In table 2:
"AF 100%" means that 100% of tested joints show adhesive failure.
"CF/AF 100%" means that 100% of tested joints show combined cohesive- and adhesive failure.
"CF, AF/CF 20%" means that 20% of tested joints show combined adhesive and cohesive failure, and the rest of tested joints, i.e. 80%, shows cohesive failure.
"CF/AF, CF 33%, SCF/CF 11%" means that 11% of tested joints show combined special cohesive and cohesive failure, 33% of tested joints show cohesive failure, and rest of tested joints (56%) shows combined cohesive and adhesive failure.
"CF 100%" means that 100% of tested joints show cohesive failure.
"CF, SCF 20%" means that 20% of tested joints show special cohesive failure, and the rest of tested joints, i.e. 80%, shows cohesive failure.

From table 2 it can be seen that, whilst in the bonded structure without flame-treated bonding surfaces adhesive failure at "initial" conditions takes place, when the bonding surfaces are flame-treated, either adhesive failure is drastically reduced (e.g. in the case of 1-K bonding agent) or only cohesive failure occurs (e.g. in the case of 2-K bonding agent). This indicates that for the flame-treated bonding surfaces, these surfaces are activated, and as such, adhesion between the bonding agent and the bonding surface is increased.

Considering failure at "PV 1200" conditions, it can be seen that, although for the sample with the 1-K bonding agent, adhesive failure occurs for both the comparative example (Ex. 4*) and the flame-treated bonding surface (Ex. 4), the lap shear strength is higher for the flame-treated bonding surface. Therefore, this also indicates that adhesion between the bonding agent and the bonding surface is increased when the bonding surface is flame treated. For the samples with 2-K bonding agent, adhesive failure occurs in the comparative example (Ex. 5*), whilst only cohesive failure and special cohesive failure occurs in the sample having flame-treated bonding surfaces (Ex. 5).

Additional tests were performed on samples of a bonded structure having plastic parts made of PC/ABS filled, PC/ASA or ABS, using 1-K or 2-K boding agents (B. Agent). Samples were subjected to different conditions: initial, cataplasma (Catapl.) and PV 1200. Results are shown on Table 3. In this table, Experiments (Ex.) with an (*) refer to comparative examples of samples which were not subjected to flame treatment.

TABLE 3

| Ex | Material | B. Agent | Adhesion Lap Shear Strength [MPa] Initial | Catapl. | PV 1200 | Type of failure Initial | Catapl. | PV 1200 |
|---|---|---|---|---|---|---|---|---|
| 6* | PC/ABS filled | 1-K | 0.75 | 1.60 | 1.45 | AF 100% | CF 100% | CF, CF/AF 33% |
| 6 | | 1-K | 5.60 | 4.00 | 3.30 | CF 100% | AF, CF 33% | AF, AF/CF 33% |
| 7* | PC/ASA | 1-K | 1.00 | 1.40 | 1.10 | AF 100% | AF 100% | AF 100% |
| 7 | | 1-K | 5.40 | 4.00 | 3.75 | CF 100% | CF 100% | AF 100% |
| 8* | | 2-K | 3.60 | 2.60 | 3.75 | AF, AF/CF 16% | CF 100% | CF 100% |
| 8 | | 2-K | 2.75 | 3.25 | 4.25 | CF 100% | CF 100% | CF 100% |
| 9* | ABS | 1-K | 1.60 | 1.50 | 1.55 | AF 100% | AF 100% | AF 100% |
| 9 | | 1-K | 5.60 | 5.00 | 4.75 | CF 100% | CF 100% | CF 100% |
| 10* | | 2-K | 3.60 | 4.00 | 4.40 | AF 100% | CF, CF/AF 17% | CF 100% |
| 10 | | 2-K | 4.25 | 5.00 | 6.25 | CF 100% | CF 100% | CF 100% |

In table 3:
"AF 100%" means that 100% of tested joints show adhesive failure.
"CF 100%" means that 100% of tested joints show cohesive failure.
"CF, CF/AF 33%" means that 33% of tested joints show combined cohesive and adhesive failure, and the rest of tested joints, i.e. 66%, shows cohesive failure.
"AF, CF 33%" means that 33% of tested joints show cohesive failure, and the rest of tested joints, i.e. 66%, shows adhesive failure.
"AF, AF/CF 33%" means that 33% of tested joints show combined adhesive and cohesive failure, and the rest of tested joints, i.e. 66%, shows adhesive failure.
"AF, AF/CF 16%" means that 16% of tested joints show combined adhesive and cohesive failure, and the rest of tested joints, i.e. 84%, shows adhesive failure.
"CF, CF/AF 17%" means that 17% of tested joints show combined cohesive and adhesive failure, and the rest of tested joints, i.e. 83%, shows cohesive failure.

Tables 2 and 3 show that, whilst in the bonded structure without flame-treated bonding surfaces adhesive failure at "initial" conditions takes place, when the bonding surfaces are flame-treated, either adhesive failure is drastically or only cohesive failure occurs. This indicates that for the flame-treated bonding surfaces, these surfaces are activated, and as such, adhesion between the bonding agent and the bonding surface is increased.

Considering failure at "cataplasm" and "PV 1200" conditions, table 3 shows that flame treatment according to the invention increases the lap shear strength, and in some cases also decreases or eliminates adhesive failure. Therefore, this also indicates that adhesion between the bonding agent and the bonding surface is increased when the bonding surface is flame treated. Additional tests were performed on samples of a bonded structure having plastic parts made of PP LGF filled or PP talc filled, using 1-K or 2-K boding agents (B. Agent). Samples were subjected to different conditions: initial, cataplasma (Catapl.) and PV 1200. It was observed that when the bonding surfaces are untreated, i.e. without flame-treatment, only adhesion failure is observed and the lap shear strength is below 1 MPa, which indicates a low adhesion between the bonding surfaces and the bonding agent. However, when the plastic parts were subjected to the flame-treatment mentioned above the results shown in table 4 were obtained.

TABLE 4

| Ex | Material | B. Agent | Adhesion Lap Shear Strength [MPa] Initial | Catapl. | PV 1200 | Type of failure Initial | Catapl. | PV1200 |
|---|---|---|---|---|---|---|---|---|
| 11 | PPLGF Filled | 1-K | 6.00 | 5.25 | 4.60 | CF 100% | CF 100% | CF, CF/AF 33% |
| 12 | | 2-K | 4.00 | 3.70 | 3.85 | CF, AF/CF 22% | CF 100% | CF 100% |
| 13 | PP talc Filled | 1-K | 4.10 | 4.10 | 3.20 | SCF 100% | AF, SCF 33% | SCF 100% |
| 14 | | 2-K | 3.70 | 3.30 | 3.20 | CF, SCF 22% | CF 100% | CF, CF/AF 33% |

In table 4:
"CF 100%" means that 100% of tested joints show cohesive failure.
"CF, CF/AF 33%" means that 33% of tested joints show combined cohesive and adhesive failure, and rest of tested joints, i.e. 67%, shows cohesive failure.
"CF, AF/CF 22%" means that 22% of tested joints show combined adhesive and cohesive failure, and the rest of tested joints, i.e. 78%, shows cohesive failure.
"SCF 100%" means that 100% of tested joints show special cohesive failure.
"AF, SCF 33%" means that 33% of tested joints show special cohesive failure, and the rest of tested joints, i.e. 67%, shows adhesive failure.
"CF, SCF 22%" means that 22% of tested joints show special cohesive failure, and the rest of tested joints, i.e. 78%, shows cohesive failure.

As can be seen in table 4, also for other types of plastic parts, when the bonding surfaces are flame treated, adhesive failure is reduced compared to non-treated bonding surfaces, or only cohesive and/or special cohesive failure takes places. This indicates that the flame-treated surfaces in the bonded structure according to the invention have activated surfaces, which have increased adhesion with the bonding agent.

Effect of Flame Treatment and Primer

In order to show the effect of applying a primer to a flame-treated surface, tests were performed on samples of a bonded structure having plastic parts made of PP LGF filled or PP talc filled, and using 1-K or 2-K boding agents (B. Agent) and the corresponding primer.

The plastic parts were subjected to the flame treatment described above, subsequently a primer was applied to the flame-treated bonding surfaces and then the bonding agent was applied to one of the bonding surfaces. Samples were subjected to different conditions: initial, cataplasma (catapl.) and PV 1200.

Results are presented on table 5, in which the adhesion lap shear strength and the type of failure are shown.

TABLE 5

| Ex | Material | B. Agent | Adhesion Lap Shear Strength [MPa] | | | Type of failure | | |
|---|---|---|---|---|---|---|---|---|
| | | | Initial | Catapl. | PV 1200 | Initial | Catapl. | PV1200 |
| 15 | PPLGF Filled | 1-K | 6.70 | 5.55 | 5.20 | SCF 100% | CF, CF/AF 33% | CF/SCF, CF 33% |
| 16 | | 2-K | 4.60 | 4.15 | 4.35 | CF, AF/CF 20%, AF 20% | CF 100% | CF, CF/AF 20% |
| 17 | PP talc Filled | 1-K | 5.30 | 4.60 | 4.50 | SF 100% | SCF/CF, SF 30% | SCF/CF, SCF 33% |
| 18 | | 2-K | 3.60 | 3.35 | 3.60 | CF, SCF 20% | CF 100% | CF 100% |

In table 5:
- "SCF 100%" means that 100% of tested joints show special cohesive failure.
- "SF 100%" means that 100% of tested joints show normal substrate failure.
- "CF, CF/AF 33%" means that 33% of tested joints show combined cohesive and adhesive failure, and the rest of tested joints, i.e. 67%, shows cohesive failure.
- "CF/SCF, CF 33%" means that 33% of tested joints show cohesive failure, and the rest of tested joints, i.e. 67%, shows combined cohesive and special cohesive failure.
- "CF, AF/CF 20%, AF 20%" means that 20% of tested joints show combined adhesive and cohesive failure, 20% of tested joints show adhesive failure, and the rest of tested joints, i.e. 40%, shows cohesive failure.
- "CF 100%" means that 100% of tested joints show cohesive failure.
- "CF, CF/AF 20%" means that 20% of tested joints show combined cohesive and adhesive failure, and the rest of tested joints, i.e. 80%, shows cohesive failure.
- "SCF/CF, SF 30%" means that 30% of tested joints show normal substrate failure, and the rest of tested joints, i.e. 70%, shows combined special cohesive failure and cohesive failure.
- "SCF/CF, SF 33%" means that 33% of tested joints show normal substrate failure, and the rest of tested joints, i.e. 67%, shows combined special cohesive failure and cohesive failure.
- "CF, SCF 20%" means that 20% of tested joints show special cohesive failure, and the rest of tested joints, i.e. 80%, shows cohesive failure.

From the results shown in table 5, it can be seen that when a primer is applied to a flame-treated bonding surface, the adhesion lap shear strength increases when compared with bonding surfaces without a primer. This is an indication of a further activation of the bonding surface.

Effect of Gas-to-Air Ratio

In order to show the effect of the ratio between propane and oxygen, gas and air (containing 20.95 vol % oxygen) ratios were varied during treatment with a flame of a propane-comprising gas comprising 100% propane and a flame was produced by burning a mixture of the air and the propane-comprising gas. Tests were performed on samples of a bonded structure having plastic parts made of PP LGF filled (with a 1-K polyurethane-based adhesive (Betaseal 8000-1F from Dow®) as bonding agent). The plastic parts were subjected to the flame treatment as described above. Samples were subjected to different conditions: initial, cataplasma (catapl.). Results are presented in table 6, in which the adhesion lap shear strength and the type of failure are shown. For the lap shear strength, the standard deviation is given between brackets.

TABLE 6

| Ex | Ratio propane-gas to air | Volume ratio propane to oxygen | Adhesion Lap Shear Strength [MPa] | | Type of failure | |
|---|---|---|---|---|---|---|
| | | | Initial | Catapl. | Initial | Catapl. |
| 19 | untreated | | 0.26 (±0.09) | 0.05 (±0.00) | AF 100% | AF 100% |
| 20 | 1:28.7 | 6.01 | 5.39 (±0.54) | 4.68 (±0.20) | CF/AF 100% | CF/AF 100% |
| 21 | 1:23.9 | 5.01 | 5.49 (±0.39) | 4.41 (±0.13) | CF 100% | CF, CF/AF 50% |
| 22 | 1:21.5 | 4.50 | 5.51 (±0.05) | 4.16 (±0.14) | CF 100% | CF 100% |

In Table 6:

"AF 100%" means that 100% of tested joints show adhesive failure.

"CF 100%" means that 100% of tested joints show cohesive failure.

"CF/AF 100%" means that 100% of tested joints show cohesive and adhesive failure.

"CF, CF/AF 50%" means that 50% of tested joints show combined cohesive and adhesive failure, and the rest of tested joints, i.e. 50%, shows cohesive failure.

It can be seen from Table 6 that a propane to oxygen ratio of above 5.01 leads to full cohesive failure tested initially and after Cataplasma accelerated aging test. Propane to oxygen volume ratios of ≤5.01 results in no adhesive failure in the initial testing. It can also be seen that even less cohesive/adhesive failure is obtained after cataplasma when a propane to oxygen volume ratio of less than 5.0 is used. For safety reasons, it is preferred to have a volume ratio of propane to oxygen of at least 3.50.

All examples clearly show that the process for the preparation of a bonded structure according to the invention comprises at least one flame-treated bonding surface, which is an activated surface having increased surface energy, increased polarity and lower contact angle with water. The combination of all these characteristics leads to a bonding surface that has improved adherence with a bonding agent, basecoat or foam, which results in a bonded structure having higher adhesion shear strength and/or reduced (or even completely suppressed) adhesive failure.

Adherence of the flame-treated bonding surface can be further improved if a primer is applied to this surface before bringing this into contact with the bonding agent or basecoat.

One or more objects of the present invention are obtained by the embodiments cited above and in the appended claims.

The invention claimed is:

1. A process for the preparation of a bonded structure comprising at least a first plastic part having a first bonding surface, said process comprising the steps of:
   a) treating at least part of a first bonding surface of said first plastic part with a flame of a propane gas, wherein, during treatment with a flame of the propane gas, a flame is produced by burning a mixture consisting of air and the propane gas, and optionally one or more of methane, ethane, butane, pentane, and hexane, wherein the gas-to-air ratio is chosen such that the propane gas to oxygen volume ratio is from 1:4.50 to less than 1:5.01 to obtain a first plastic part having a flame-treated first bonding surface, wherein the first plastic part comprises polypropylene and 0 to 5% of an additive wherein the polypropylene is not blended with another polymer, and
   b1) providing a second plastic part, wherein the second plastic part has a second bonding surface and
   c1) contacting said first and second bonding surfaces with a bonding agent together by contacting at least part of the flame-treated first bonding surface and at least part of said second bonding surface with said bonding agent.

2. The process according to claim 1, wherein, before step c1), at least part of the second bonding surface is treated with a flame of a propane gas, wherein, a flame is produced by burning a mixture of air and the propane gas, wherein the gas-to-air ratio is chosen such that the propane gas to oxygen volume ratio is equal to or less than 1:5.01 to obtain a second plastic part having a flame-treated second bonding surface.

3. The process according to claim 1, wherein a burner is used for producing the flame, said burner comprising at least one nozzle for providing a mixture of air and the propane gas to be burned, wherein a gap between the at least one nozzle and said first bonding surface is between 5 cm and 15 cm.

4. The process according to claim 1, wherein the temperature reached on the said flame-treated first bonding surface during treatment with a flame of a propane gas, is between 30° C. and 90° C.

5. The process according to claim 1, wherein a surface energy of said flame-treated first bonding surface is higher than 30 mN/m, and a polar part of the surface energy is higher than 1.5 mN/m.

6. The process according to claim 1, further comprising a step of applying a primer on said flame-treated first bonding surface before performing step c1.

7. The process according to claim 1, wherein the bonding agent is a single-component adhesive.

8. The process according to claim 1, wherein the bonding agent is a two-component adhesive, comprising a first resin component; and comprising a second hardener component.

9. The process according to claim 1, wherein the second plastic part comprises a polymer selected from the group consisting of: polyolefin (PO), polycarbonate (PC), acrylonitrile-butadiene-styrene (ABS), acrylonitrile-styrene-acrylate (ASA), and polyethylene terephthalate (PET).

10. The process according to claim 9, wherein the second plastic part comprises polypropylene and 0 to 5% of an additive wherein the polypropylene is not blended with another polymer.

11. The process of claim 1 wherein the first plastic part comprises glass fibers.

* * * * *